United States Patent [19]

Ito et al.

[11] 4,129,875

[45] Dec. 12, 1978

[54] PHASE CONTROL FOR INK JET PRINTER

[75] Inventors: Syoichi Ito, Ibaraki; Takahiro Yamada, Hitachi, both of Japan

[73] Assignee: Hitachi, Ltd., Japan

[21] Appl. No.: 722,032

[22] Filed: Sep. 10, 1976

[30] Foreign Application Priority Data

Sep. 19, 1975 [JP] Japan ........................... 50-112612

[51] Int. Cl.[2] ........................................ G01D 18/00

[52] U.S. Cl. ................................................ 346/75

[58] Field of Search ...................................... 346/75

[56] References Cited

U.S. PATENT DOCUMENTS 3,898,673 8/1975 Haskell ........................... 346/75 X 3,999,188 12/1976 Yamada ............................ 346/75

*Primary Examiner*—Joseph W. Hartary

*Attorney, Agent, or Firm*—Craig & Antonelli

[57] ABSTRACT

An ink jet printer uses a detector circuit for detecting the relation between the generation of an ink droplet and the phase of a charging signal on the basis of an output signal of a sensor against which the ink droplets charged by a phase detecting signal collide. A phase shift circuit is provided for matching the generation of the ink droplet and the phase of the charging signal on the basis of an output signal of the detector circuit, and an inhibit circuit is used for inhibiting the phase shift circuit from operating for a predetermined period after the phase shift circuit has operated.

4 Claims, 9 Drawing Figures

F/G. 7
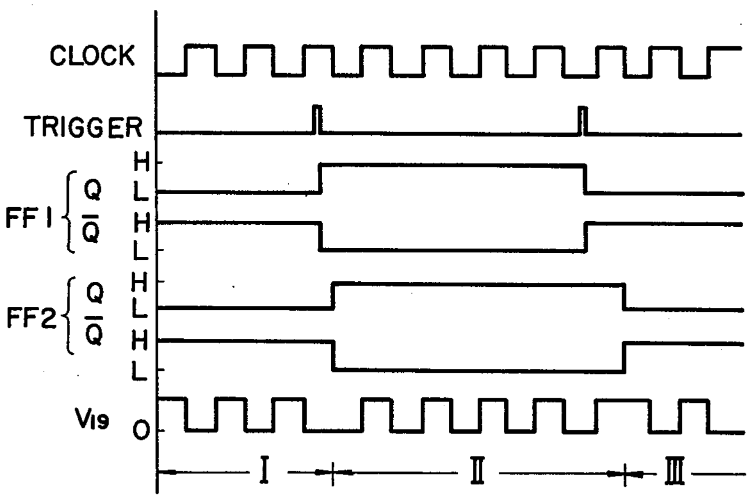
F/G. 8
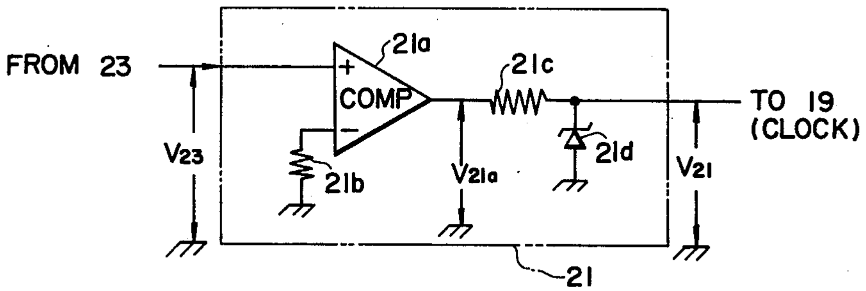
F/G. 9
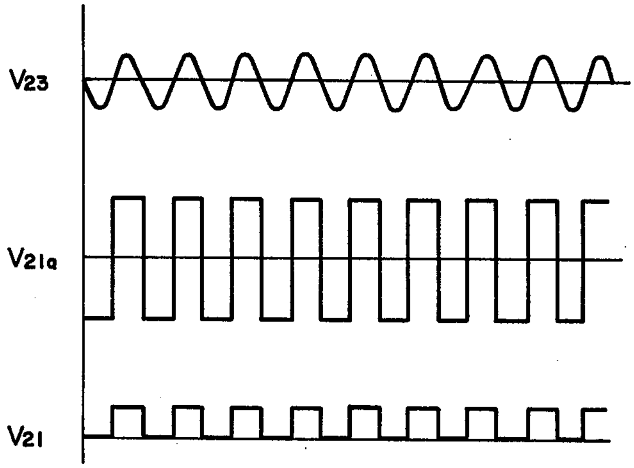

PHASE CONTROL FOR INK JET PRINTER

BACKGROUND OF THE INVENTION

1. Field of the Invention

This invention relates in general to an ink jet printer, and more particularly, to a phase control circuit for an ink jet printer.

2. Description of the Prior Art

In an ink jet printer of the type to which the present invention is directed, ink droplets are formed from an ink jet stream discharged under pressure from a nozzle and a charge is applied to the ink droplet which conforms with a desired amount of deflection of the ink droplet necessary to direct the ink droplet to a desired location on a recording medium. In order to bestow the charges on the ink droplets, a charging electrode is disposed near the jet nozzle so that the ink stream discharged from the jet nozzle and the charging electrode form an electrostatic capacity. The electrostatic capacity formed by the ink stream and the charging electrode is controlled by a charging signal applied to the charging electrode, so that as the leading end of the ink stream separates away from the main body of the ink stream, while holding the charge applied thereto, the charged ink droplet is formed. Accordingly, the charging signal corresponding to the desired amount of deflection of the ink droplet must be applied to the charging electrode at precisely the time of formation of the ink droplet if the droplet is to receive a charge conforming with the desired amount of deflection.

The ink droplet having separated from the leading end of the ink stream flies toward a catcher and passes between deflecting electrodes midway of its path to the recording medium. The charged ink droplet is deflected in accordance with the quantity of the charge thereon and the magnitude of the field between the deflecting electrodes, and thereby avoids the catcher to collide against a recording medium and to form a recording dot thereon.

In such an ink jet printer, in order to apply a proper charge on each ink droplet, the charging of the electrostatic capacity formed by the ink stream and the charging electrode must be in a stable state (saturated state) at the moment at which the ink droplet separates from the ink stream. To this end, an electromechanical transducer is mounted on the nozzle and subjects the ink stream to a vibration so as to control the generation of the ink droplets to occur at regular intervals in synchronism with the vibration voltage. However, the vibration voltage to be applied to the electromechanical transducer and the separation phase of the ink droplets are not always constant since the separation phase is also subject to other conditions, such as ink pressure, etc. Accordingly, even when the charging signal in the form of pulses synchronized with the vibration voltage is impressed on the charging electrode, the ink droplet does not always receive the proper quantity of charge due to the ink droplet being formed out of phase with the charging signal.

In order to check the phase of ink droplet formation with respect to the phase of the charging signal, certain ink droplets are charged by a phase detecting signal of known magnitude and pulse width. Then whether or not the particular ink droplet is properly charged is discriminated, and the phase relation between the vibration voltage and the phase detecting signal (or recording signal) is matched. In this case, the central phase of the phase detecting signal is set to be equal to that of the recording signal. A sensor is disposed on the path along which the ink droplet properly charged by the phase detecting signal is deflected and flies, the phase relation is discriminated in dependence on whether or not the ink droplet charged by the phase detecting signal is deflected to collide against the sensor.

During the phase matching period, the ink droplet is charged by the phase detecting signal to match the phase relation, while during the recording period, the ink droplet is properly charged by the recording signal. The pulse width of the phase detecting signal is made smaller than that of the recording signal. In this way, deterioration of the phase relation between the phase detecting signal and the ink droplet can be detected at an earlier time than that between the recording signal and the ink droplet, and hence, the phase matching can be effected at an early stage.

SUMMARY OF THE INVENTION

An object of this invention is to make it possible to properly match the phase relation between the generation of the ink droplet and the charging signal in such an ink jet printer.

Another object of this invention is to provide an ink jet printer having a phase matching circuit which is highly reliable and therefore not subject to malfunction.

Still another object of this invention is to provide an ink jet printer having a phase matching circuit which can be simply constructed.

The essential feature of this invention resides in the fact that, after the phase relation between the charging signal and the generation of the ink droplet has worsened and the phase matching circuit has operated, the next phase matching operation of the phase matching circuit is inhibited for a prescribed period of time.

BRIEF DESCRIPTION OF THE DRAWINGS

FIG. 7 is a diagram of operation characteristic curves of the phase shift circuit;

FIG. 8 is a circuit diagram of a wave forming circuit; and

FIG. 9 is a diagram of operation characteristic curves of the wave forming circuit.

DETAILED DESCRIPTION OF THE PREFERRED EMBODIMENTS

Figure 1:
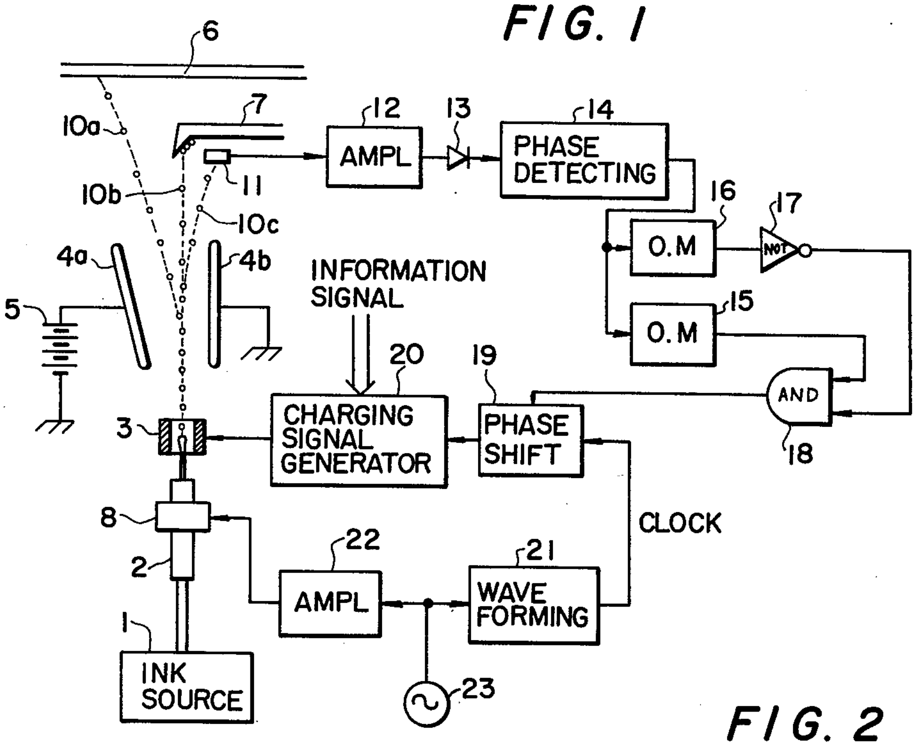
FIG. 1 is a schematic diagram of an ink jet printer.

FIG. 1 shows a block diagram of an ink jet printer according to this invention. Numeral 1 designates an ink source and numeral 2 designates a nozzle. Electrically-conductive ink under pressure is supplied from the ink source 1 to the nozzle 2, which is provided at its end with a small-diameter aperture from which the ink supplied to the nozzle is emitted in the form of an ink stream 10. An electromechanical transducer 8, which is mechanically coupled with the nozzle body, controls the regular generation of drops.

Figure 2:
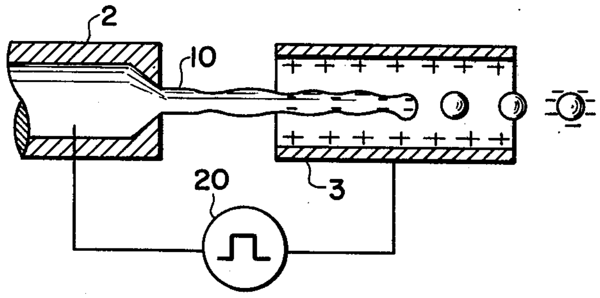
FIG. 2 is a detail view illustrating the charging of ink droplets.

Numeral 3 designates a charging electrode disposed along the path of the ink stream 10. At the position of the charging electrode 3, the ink stream 10 emitted from the aperture of the nozzle 2 breaks into ink droplets 10*a*, 10*b*, 10*c*, . . . . in succession. The charging electrode 3 and the ink stream 10 are so arranged, as seen in FIG. 2, as to form an electrostatic capacity. Charges bestowed on the leading end of the ink stream 10 are confined within the ink droplet when that part of the ink stream 10 separates away.

Deflecting electrodes 4*a* and 4*b* are disposed on either side of the path of the ink droplets 10*a*, 10*b*, . . . and are connected to a d.c. high voltage power supply 5, whose plus electrode is connected to the deflecting electrode 4*a* and whose minus electrode is connected to the deflecting electrode 4*b*. Thus, a constant electrostatic field is produced between the deflecting electrodes to deflect charged particles to an extent depending on the charge thereon. Shown at 6 is a recording medium, against which the ink droplet 10*a* collides to form a recording dot. Numeral 7 designates a catcher positioned along the path on which the ink droplet is generated, and which captures the ink droplet 10*b* not receiving a recording charge and returns the ink droplet to the ink source 1 by recovery means (not shown). Shown at 11 is an ink sensor, which generates an electric signal when the ink droplet 10*c*, having received a predetermined charge for phase detection, impinges thereon.

An amplifier 12 amplifies the output signal of the ink sensor 11, and a rectifier 13 rectifies the output signal of the amplifier 12 into a d.c. voltage signal. A phase detecting circuit 14 receives the output signal of the rectifier 13, and delivers a signal of high level when the phase relation between the generation of the ink droplet and a charging signal is in the normal state, but delivers a signal of low level when the phase relation is in the abnormal state.

Figure 4:
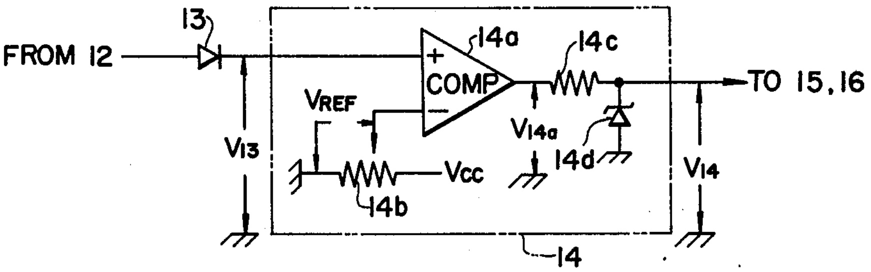
FIG. 4 is a circuit diagram of a phase detecting circuit.

An example of the configuration of the phase detecting circuit 14 is shown in FIG. 4. Referring to FIG. 4, numeral 14*a* designates a comparator, 14*b* a potentiometer, 14*c* a resistor, and 14*d* a zener diode. The plus input terminal (+) of the comparator 14*a* is connected to the cathode of the rectifier 13, while the minus input terminal (−) thereof is connected to the slider of the potentiometer 14*b*. The resistor 14*c* is connected in series with the output of the comparator 14*a*. The zener diode 14*d* is connected on the output side of the resistor 14*c* so as to control the magnitude of an output signal and also to short-circuit the output signal of minus polarity.

The one-shot multivibrators 15 and 16 (FIG. 1) are respectively operated in response to the level change of the output signal of the phase detecting circuit 14 from "high" to "low." Numeral 17 indicates a NOT gate, numeral 18 an AND gate, numeral 19 a phase shift circuit, numeral 20 a recording signal generator, and numeral 21 a wave forming circuit. The one-shot multivibrator 15 serves to produce a trigger signal for the phase shift circuit 19 to effect the phase control. The other one-shot multivibrator 16 serves to inhibit the trigger signal from being inputted to the phase shift circuit 19 again for a certain period of time after the phase shift circuit 19 has conducted the phase control operation as stated above.

The metastable time 30 of the one-shot multivibrator 16 is so set as to be equal to the afore-cited certain period of time. If the one-shot multivibrators 15 and 16 operate at the same time and the NOT gate 17 provides a signal without any time lag, then the AND gate 18 receives high and low inputs and cannot provide the trigger signal. It is accordingly necessary to establish at least a time difference to enable the AND gate 18 to generate the trigger signal by delaying the operation of the one-shot multivibrator 16 or by bestowing a time delay to the NOT gate 17.

Figure 6:
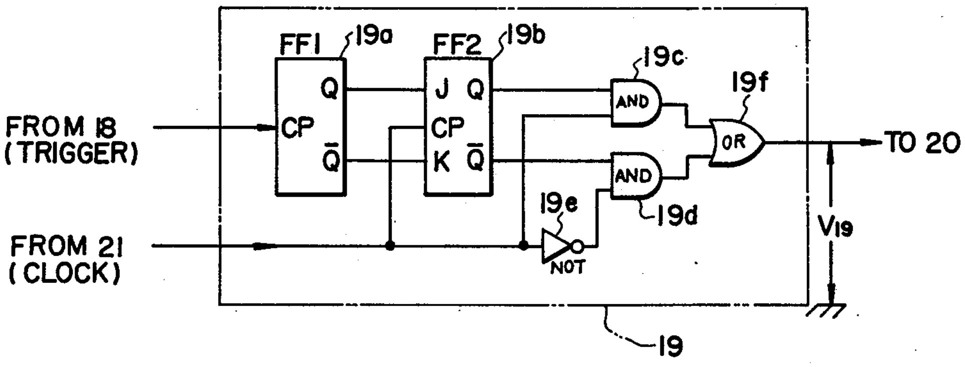
FIG. 6 is a circuit diagram of a phase shift circuit.

A specific example of the phase shift circuit 19 is illustrated in FIG. 6. The phase shift circuit 19 has a T type flip-flop 19*a*, a JK type flip-flop 19*b*, AND gates 19*c* and 19*d*, a NOT gate 19*e*, and an OR gate 19*f*. A clock terminal CP of the flip-flop 19*a* is connected to the AND gate 18. A clock terminal CP of the flip-flop 19*b* is connected to the wave forming circuit 21, and input terminals J and K thereof are respectively connected to output terminals Q and $\overline{Q}$ of the flip-flop 19*a*. The two input terminals of the AND gate 19*c* are connected to an output terminal Q of the flip-flop 19*b* and the wave forming circuit 21, respectively. One of the two input terminals of the AND gate 19*d* is connected to an output terminal $\overline{Q}$ of the flip-flop 19*b*, and the other is connected through the NOT gate 19*e* to the wave forming circuit 21. The two input terminals of the OR gate 19*f* are respectively connected to output terminals of the AND gates 19*c* and 19*d*, while an output terminal thereof is connected to the recording signal generator 20.

The recording signal generator 20, which is known in the art, prepares the charging signal on the basis of the timing pulse from the pulse shift circuit 19 and an information signal, and sends the charging signal to the charging electrode 3.

The internal construction of the wave forming circuit 21 is illustrated in FIG. 8. The circuit 21 shown in FIG. 8 includes a comparator 21*a*, resistors 21*b* and 21*c*, a zener diode 21*d*. The plus input terminal (+) of the comparator 21*a* is connected to a high frequency power supply 23, while the minus input terminal (−) thereof is grounded through the resistor 21*b*. An output signal of the comparator 21*a* is derived through the resistor 21*c*, and is shaped by the zener diode 21*d*. An amplifier 22 serves to amplify the output voltage of the high frequency power supply 23 and to impress the amplified signal on the electromechanical transducer 8.

Description will now be made of the operation of ink jet recording in the foregoing system. As illustrated in FIG. 2, the pressurized ink fed from the ink source 1 to the nozzle 2 is emitted from the small aperture in the end of the nozzle. The emitted ink is in the form of a stream 10 near the end of the nozzle 2, and the leading end part of the ink stream 10 forms an electrostatic capacity with the charging electrode 3. Between the ink stream 10 and the charging electrode 3, the charging signal is applied from the recording signal generator 20.

Figure 3:
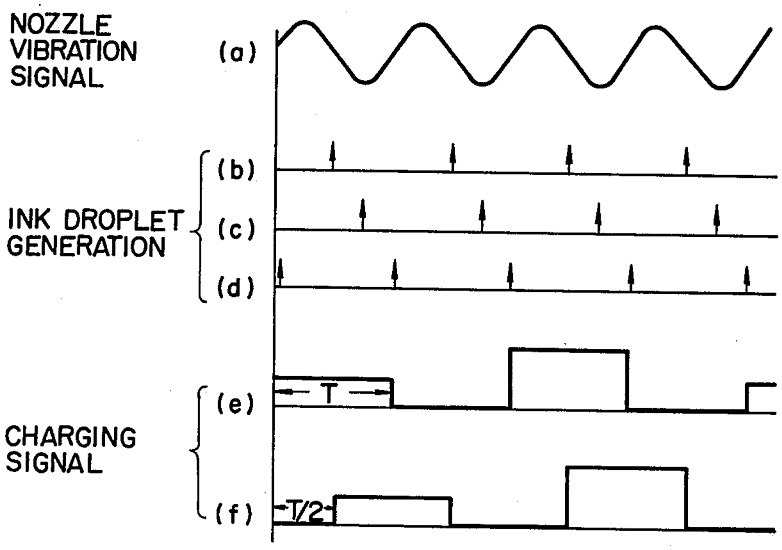
FIG. 3 is a waveform diagram illustrating the phase relations of the drop charging operation.

Charges are applied to the ink stream 10 by the signal voltage. When, at this time, a vibrating voltage as shown at (a) in FIG. 3 is applied to the electromechanical transducer 8 on the basis of the output voltage of the high frequency power supply 23, the ink droplets are generated with a timing as shown at (b), (c) or (d) in FIG. 3. In this case, where the charging signal produced by the recording signal generator 20 is as shown at (e) in FIG. 3, the supply of the charges to the ink droplets is properly provided with the timing (b) or (c). At the timing (d), however, it is impossible to give the ink droplets the charges in an amount properly corresponding to the magnitude of the charging signal. The cause therefor is that the charging signal changes at the moment of the separation of the ink droplet from the ink stream, so that charging of the electrostatic capacity between the ink stream and the charging electrode 3 is unstable. Such inferior charging due to the unstable state arises also in the case where the generation of the ink droplet occurs at the initial stage of the rise of the charging signal. In such case, the charging signal may be changed to a timing as shown at (f) in FIG. 3. In this way, the generation of the ink droplets in FIG. 3(*d*) is effected at a time in which the charging by the charging signal illustrated in FIG. 3(*f*) is stable, and hence, the improper charging for the ink droplets is avoided.

Regarding the phase adjustment of the charging signal, it is convenient to set the quantity of phase adjustment at T/2, where T denotes the pulse width of the charging signal. Such phase adjustment is executed by the charging of the ink droplet based on the charging signal for phase detection. If the pulse widths of the phase detecting signal and the recording signal are equal, the phase adjustment is executed only after an incorrect recording appears. Therefore, the phase detecting signal ought to be made narrower than the recording signal so as to perform the phase adjustment before incorrect recording occurs.

The a.c. voltage outputted from the high frequency power supply 23 in FIG. 1 is applied through the amplifier 22 to the electromechanical transducer 8. Further, the a.c. voltage is shaped into clock pulses by the wave forming circuit 21. This will now be explained with reference to FIGS. 8 and 9. The a.c. voltage $V_{23}$ outputted from the high frequency power supply 23 is inputted to the plus input terminal (+) of the comparator 21*a*. Thus, the output signal $V_{21a}$ is provided from the comparator 21*a*. The output signal $V_{21a}$ is outputted as the clock signal $V_{21}$ by the resistor 21*c* and the zener diode 21*d*. The phase shift circuit 19 operates upon receiving the clock signal $V_{21}$, and generates the charging signal from the charging signal generator 20.

The circuit operation of the phase shift circuit 19 will be explained with reference to FIGS. 6 and 7. The clock signal $V_{21}$ is applied to the JK type flip-flop 19*b* (FF2). Then the flip-flop 19*b* has either the output Q or $\overline{Q}$ at the high level in synchronism with the rise of the clock signal. In the case where the output terminal $\overline{Q}$ of the flip-flop 19*b* is at a high level, when the clock signal $V_{21}$ is at a low level, the AND gate 19*d* provides an output, and the output $V_{19}$ of the phase shift circuit 19 is as seen in region I in FIG. 7. In the case where the output terminal Q of the flip-flop 19*b* is at a high level, when the clock signal $V_{21}$ is at a high level the AND gate 19*c* provides an output, and the output $V_{19}$ of the phase shift circuit 19 is as seen in region II in FIG. 7. It will be understood that region I and region II represent opposite phases. Which of the output terminals Q and $\overline{Q}$ of the flip-flop 19*b* is put into the high level is determined by the T type flip-flop 19*a* (FF1). The flip-flop 19*a* has either of the output terminals Q and $\overline{Q}$ placed at a high level by the trigger signal fed from the AND gate 18.

The charging signal generator 20 generates the charging signal (FIG. 3(*e*) or 3(*f*) on the basis of the output signal $V_{19}$ of the phase shift circuit 19. The charging signal generator 20 has a flip-flop which operates in synchronism with the rise of the output signal $V_{19}$. Where the output signal $V_{19}$ is as seen in the region I in FIG. 7, the charging signal (f) in FIG. 3 is generated. Where the output signal $V_{19}$ is as seen in the region II, the charging signal (e) is generated. The charging signal which is generated in case of recording becomes a voltage of a magnitude corresponding to a desired amount of deflection of the ink droplet to be directed to a particular point on the recording medium. In case of phase detection, if the ink droplet is properly charged, the charging signal is a voltage of a magnitude necessary to cause it to collide against the sensor 11. Regarding the pulse width of the charging signal, the phase detecting signal is made somewhat narrower than the recording signal. These are controlled by the information signal.

The ink droplet 10*c* charged on the basis of the phase detecting signal collides against the ink sensor 11. In this embodiment, the phase detecting signal is a voltage opposite in polarity to the recording signal. The phase detecting signals are periodically produced among the recording signals.

The ink droplet 10*c* properly charged by the phase detecting signal collides against the ink sensor 11 and the ink sensor 11 converts the collision energy into an electric signal. The amplifier 12 amplifies the output signal of the ink sensor 11, and the rectifier 13 rectifies the amplified signal and applies the rectified signal to the phase detecting circuit 14.

Figure 5:
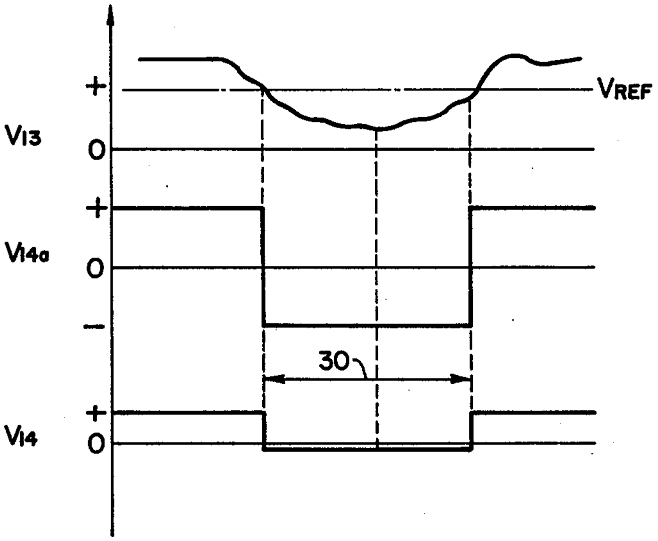
FIG. 5 is a diagram of operation characteristic curves of the phase detecting circuit.

The function of the phase detecting circuit 14 will be explained with reference to FIGS. 4 and 5. The magnitude of the output voltage $V_{13}$ of the rectifier 13 is proportional to the number of the ink droplets 10*c* colliding against the ink sensor 11. The output voltage $V_{13}$ is applied to the comparator 14*a* of the phase detecting circuit 14. A comparison reference voltage $V_{REF}$ of the comparator 14*a* is given by the potentiometer 14*b*. The magnitude of the comparison reference voltage $V_{REF}$ is made equal to that of the voltage $V_{13}$ which is obtained from the rectifier 13 when the ink droplet is properly charged by the phase detecting signal. Accordingly, the output signal $V_{14a}$ of the comparator 14*a* is at the high level in a region in which the relation between the generation of the ink droplet and the phase of the charging signal is correct, and it is at the low level in a region in which the relation is incorrect.

The output signal $V_{14a}$ is processed by the resistor 14*c* and the zener diode 14*d* and is delivered as the output signal $V_{14}$. The output signal $V_{14}$ is applied to the two one-shot multivibrators 15 and 16. When the output signal $V_{14}$ changes from the high level to the low level, the output signals of the multivibrators 15 and 16 are switched to the high level, respectively. The output signal of the multivibrator 16 is converted to the low level by the NOT gate 17. Since, as previously stated, the NOT gate 17 is provided with a delay time, the two input signals of the AND gate 18 reach the high level simultaneously and the AND gate outputs the trigger signal as shown in FIG. 7. The trigger signal is applied to the flip-flop 19*a* in the phase shift circuit 19. Then, the flip-flop 19*a* has the output terminals Q and $\overline{Q}$ inverted to the high level and the low level, respectively. When the clock pulse is thereafter impressed on the flip-flop 19*b*, the output terminal Q of the flip-flop 19*b* is inverted to the high level and the output terminal $\overline{Q}$ to the low level. Thus, the output signal $V_{14}$ of the phase shift circuit 19 is inverted from the anti-phase to the in-phase relative to the clock signal. Consequently, the phase of the charging signal generated from the charging signal generator 20 is shifted by T/2.

When the one-shot multivibrator reaches the metastable state, the output of the NOT gate 17 reaches the low level. Accordingly, even when the output voltage of the phase detecting circuit 14 changes thereafter, the AND gate 18 remains "off" and gives no trigger signal to the phase shift circuit 19. In this manner, the period during which the AND gate 18 is "off" is determined by the metastable time 30 of the one-shot multivibrator 16. The length of the time is set to be equal to a period in which the sensor 11 detects the ink droplet charged by the charging signal subjected to phase correction and in which the phase detecting circuit 14 can discriminate the value of the charged voltage. Usually, it is several milliseconds to several tens of milliseconds. In this embodiment, the inhibit time of the phase shift (the time during which the NOT gate 17 is "off") is set by the one-shot multivibrator 16. However, where the phase shift circuit 19 is operated by the rise of the output signal of the one-shot multivibrator 15, the inhibit time can be determined by the metastable time of the one-shot multivibrator 15. In this case, the one-shot multivibrator 16, the NOT gate 17, and the AND gate 18 can be omitted.

Although, in the foregoing embodiment, the phase shift circuit 19 is used so as to shift the phase of the charging signal, it can also shift the vibration voltage by being incorporated in the amplifier 22.

While we have shown and described one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as are obvious to one of ordinary skill in the art.

What is claimed is:

1. In an ink jet printer including means for producing a stream of ink under pressure from a nozzle along a predetermined path at a point of which said stream separates into ink droplets to be directed towards a recording medium; an electromechanical transducer coupled to said nozzle for imparting vibrations to said ink under pressure in order to control the separation of said ink droplets to occur at regular intervals; a high frequency power supply for applying a vibration voltage to said electromechanical transducer; a charging electrode disposed along said predetermined path at the point of drop separation for applying voltages to said ink droplets; deflection means for generating a deflecting electric field along the path of said ink droplets downstream of said charging electrode; charging signal generator means for applying charging signals to said charging electrodes for recording and for phase detection in response to applied clock signals synchronized to the output of said high frequency power supply; a sensor disposed at a point adjacent said predetermined path for intercepting deflected ink droplets properly charged on the basis of the phase detecting signal and for producing a signal indicative thereof; phase detecting means for discriminating the relation between the phases of said charging signal and the generation of said ink droplet on the basis of an output signal of said sensor; and phase shift adjusting means responsive to a trigger signal for changing the relation between the phases of said vibration voltage to be applied to said electromechanical transducer and the generation of said charging signal; the improvement comprising a trigger circuit means responsive to the output signal of said phase detecting means for applying said trigger signal to said phase shift adjusting means, and inhibit circuit means which inhibits said trigger circuit means from operating for a prescribed period of time after the generation of a trigger signal, wherein said inhibit circuit means comprises an AND gate which is connected between said trigger circuit means and said phase shift adjusting means, and a one-shot multivibrator which is connected between said phase detecting means and said AND gate.

2. The ink jet printer according to claim 1, wherein a metastable time of said one-shot multivibrator is set to be equal to a period in which the sensor detects the ink droplet charged by a charging signal subjected to phase correction and in which the phase detecting means discriminates the value of the output of the sensor.

3. The ink jet printer according to claim 1, wherein a metastable time of said one-shot multivibrator is set to be longer than a period in which the sensor detects the ink droplet charged by a charging signal subjected to phase correction and in which the phase detecting means discriminates the value of the output of the sensor.

4. In an ink jet printer including means for producing a stream of ink under pressure from a nozzle along a predetermined path at a point of which said stream separates into ink droplets to be directed towards a recording medium; an electromechanical transducer coupled to said nozzle for imparting vibrations to said ink under pressure in order to control the separation of said ink droplets to occur at regular intervals; a high frequency power supply for applying a vibration voltage to said electromechanical transducer; a charging electrode disposed along said predetermined path at the point of drop separation for applying voltages to said ink droplets; deflection means for generating a deflecting electric field along the path of said ink droplets downstream of said charging electrode; charging signal generator means for applying charging signals to said charging electrodes for recording and for phase detection in response to applied clock signals synchronized to the output of said high frequency power supply; a sensor disposed at a point adjacent said predetermined path for intercepting deflected ink droplets properly charged on the basis of the phase detecting signal and for producing a signal indicative thereof; phase detecting means for discriminating the relation between the phases of said charging signal and the generation of said ink droplet on the basis of an output signal of said sensor; and phase shift adjusting means responsive to a trigger signal for changing the relation between the phases of said vibration voltage to be applied to said electromechanical transducer and the generation of said charging signal; the improvement comprising a trigger circuit means responsive to the output signal of said phase detecting means for applying said trigger signal to said phase shift adjusting means, and inhibit circuit means which inhibits said trigger circuit means from operating for a prescribed period of time after the generation of a trigger signal, wherein said trigger circuit means and said inhibit circuit means comprise first and second one-shot multivibrators each having their inputs connected to the output of said phase detecting means, an AND gate having first and second inputs and an output connected to the input of said phase shift adjusting means, the output of said first one-shot multivibrator being connected to the first input of said AND gate and the output of said second one-shot multivibrator being connected through a NOT circuit having a time delay to the second input of said AND gate.

* * * * *